US008266518B2

(12) United States Patent
Di Beneditto

(10) Patent No.: US 8,266,518 B2

(45) Date of Patent: Sep. 11, 2012

(54) ANTI-TAMPER PROCESS TOOLSET

(75) Inventor: Joseph Di Beneditto, Great Falls, VA (US)

(73) Assignee: Raytheon Company, Waltham, MA (US)

(*) Notice: Subject to any disclaimer, the term of this patent is extended or adjusted under 35 U.S.C. 154(b) by 1275 days.

(21) Appl. No.: 12/007,904

(22) Filed: Jan. 16, 2008

(65) Prior Publication Data

US 2009/0183061 A1 Jul. 16, 2009

(51) Int. Cl.
*G06F 17/00* (2006.01)

(52) U.S. Cl. ......................... 715/213; 715/212; 715/219

(58) Field of Classification Search .................. 715/212, 715/213, 219, 255, 267

See application file for complete search history.

(56) References Cited

U.S. PATENT DOCUMENTS 6,535,227 B1 * 3/2003 Fox et al. ...................... 715/736
6,883,101 B1 * 4/2005 Fox et al. ........................ 726/25
7,032,244 B2 * 4/2006 Wilkes ............................ 726/23
7,096,502 B1 * 8/2006 Fox et al. ........................ 726/25
7,891,003 B2 * 2/2011 Mir et al. ........................ 726/25
7,934,103 B2 * 4/2011 Kidron .......................... 713/188
2003/0200464 A1 * 10/2003 Kidron .......................... 713/201
2004/0193943 A1 * 9/2004 Angelino et al. ................. 714/4
2005/0022028 A1 * 1/2005 Hall ............................. 713/201
2006/0100974 A1 * 5/2006 Dieberger et al. ................ 707/1
2006/0161444 A1 * 7/2006 Lubrecht et al. .................. 705/1
2006/0161879 A1 * 7/2006 Lubrecht et al. .............. 717/101
2006/0279780 A1 * 12/2006 Anno et al. .................. 358/1.15
2007/0180509 A1 * 8/2007 Swartz et al. ..................... 726/9
2007/0294766 A1 * 12/2007 Mir et al. ........................ 726/23
2010/0110095 A1 * 5/2010 Sekiguchi et al. ............ 345/589

* cited by examiner

*Primary Examiner* — Stephen Hong
*Assistant Examiner* — Gregory J Vaughn
(74) *Attorney, Agent, or Firm* — Daly, Crowley, Mofford & Durkee, LLP

(57) ABSTRACT

A tool set is provided that uses a series of modules (e.g. spreadsheet workbooks) for assessing risks/threats to and attacks against a project and developing countermeasures against such risks/threats/attacks. The project may cover a wide berth of functionality from alarm systems, computer security, building projects, etc. The roll up feature of the spreadsheet may be employed to evaluate changing scenarios in a short period of time. Ranked threats and countermeasures operable to defeat such threats may be displayed in a tree diagram generated by one or more of the modules.

15 Claims, 17 Drawing Sheets

Process for AT Assessment & Implementation
17
18
15
Threat Description
Analysis Method Description
14
16
System Description
CPI Identification
14
6
System Description
CPI Evaluation Tool
2
4
5
ID Software/ Hardware
CPI
CPI Criteria
Any CPI?
No
End
20
Yes
30
Risk Evaluation
22
28
32
34
36
40
Impact Summary
Threat Summary
Vulnerability Summary
Attack Scenarios
Exploitation Time Summary
Time Factored Risk Summary
24
26
42
44
46
50
Asset Description & Loss Impact
Asset ID & Valuation Module
Threats
Threat & Vulnerability Module
Vulnerability Assessment
Threat & Vulnerability Module
Attack Trees
Attack Module
Exploitation Time
Asset ID & Valuation Module
Time Factored Risk Computation
Risk Module
7
9
11
Threat Description
Threat Description
Threat Description
62
Need AT?
No
66
Yes
70
74
52
Acceptable?
Yes
Select Solution Sets
AT Implementation
AT Validation & Verification
AT Complete
No
54
58
Select Potential AT
Tamper Scenarios
56
60
68
72
76
80
Define Available Countermeasures
Countermeasures Module
Tamper Trees
Attack Module
AT Concepts
Concepts Selection Module
Implementation
Implementation Parameters Module
AT Requirements Fulfillment
AT Requirements Worksheets
Supporting Info
Glossary
Definitions
Misc
Worksheets

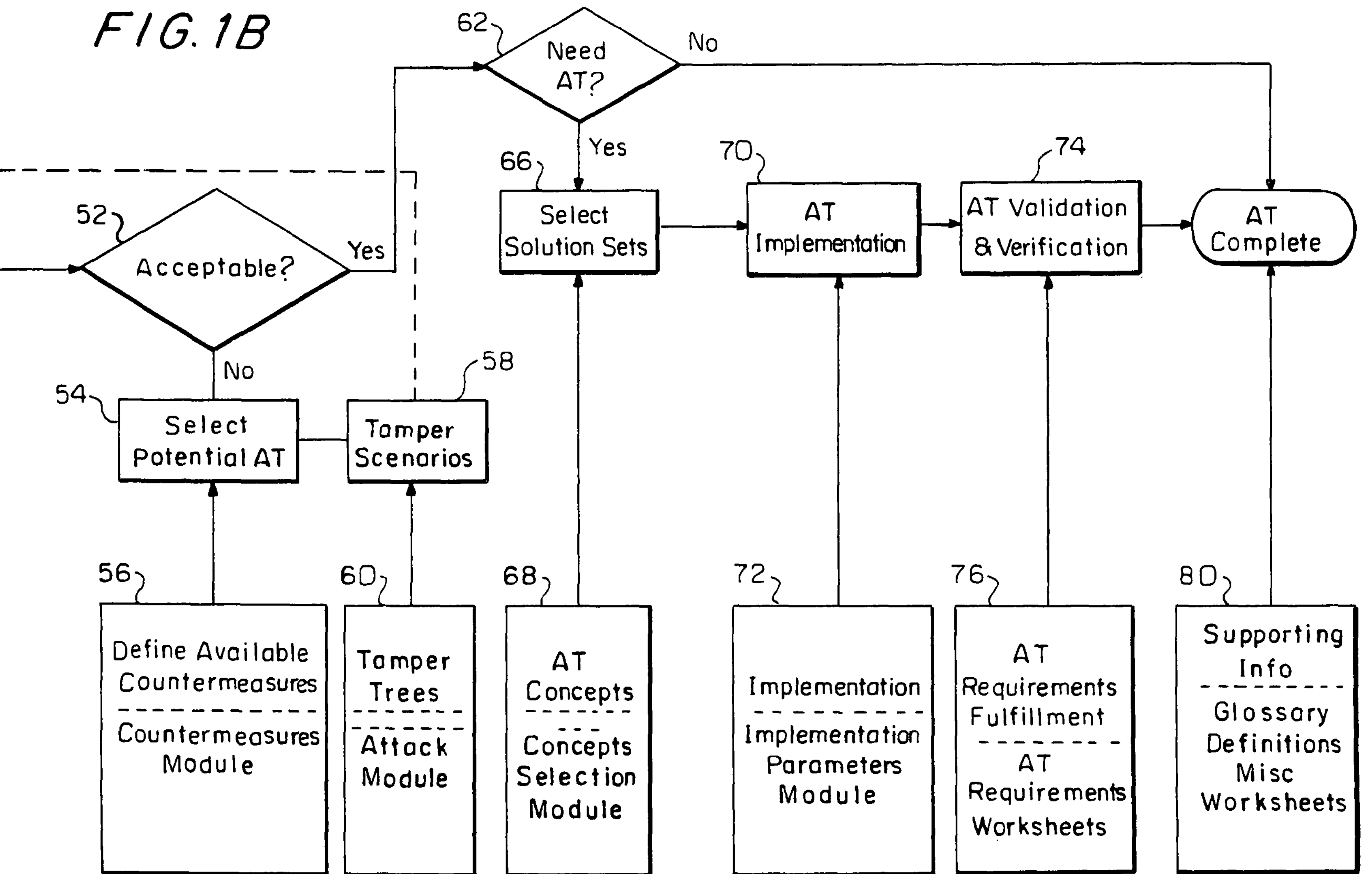
FIG. 1B
52
Acceptable?
Yes
No
54
Select Potential AT
58
Tamper Scenarios
56
Define Available Countermeasures
Countermeasures Module
60
Tamper Trees
Attack Module
62
Need AT?
No
Yes
66
Select Solution Sets
68
AT Concepts
Concepts Selection Module
70
AT Implementation
72
Implementation
Implementation Parameters Module
74
AT Validation & Verification
76
AT Requirements Fulfillment
AT Requirements Worksheets
AT Complete
80
Supporting Info
Glossary Definitions Misc Worksheets

FIG. 2A (U) Subsystem XXXXXXXXXXXXX

CLASSIFICATION (U) CPI Asset Summary Worksheet # of CPIs = 10

| CPI Asset ID | CWBS | Assoc Item Number | Asset Name | CPI Categories | Number of CPI Categories | Number of Critical Issues |
|---|---|---|---|---|---|---|
| Asset 1 | 1101 | Item 1 | Item I Name | Concepts, Design | 2 | 3 |
| Asset 2 | 11 | Item 3 | Item 3 Name | Concepts, Materials, Integration, Operations, NSA | 5 | 6 |
| Asset 3 | 21 | Item 4 | Item 4 Name | Design | 1 | 4 |
| Asset 4 | 21001 | Item 6 | Item 6 Name | Operations | 1 | 1 |
| Asset 5 | 211 | Item 7 | Item 7 Name | Materials, Design | 2 | 3 |
| Asset 6 | 1111 | Item 8 | Item 8 Name | Manufacturing | 1 | 2 |
| Asset 7 | 1A111 | Item 9 | Item 9 Name | Materials, Manufacturing, DoD 5200.39-R | 3 | 4 |
| Asset 8 | IV11 | Item 10 | Item 10 Name | Integration | 1 | 2 |
| Asset 9 | 211A | Item 11 | Item 11 Name | Integration, Operations | 2 | 2 |
| Asset 10 | 31 | Item 12 | Item 12 Name | Concepts, Materials, Operations, MCTL/DSTL/MTCR | 4 | 4 |

F/G. 2B

CWBS Level 1
CWBS Level 2
CWBS Level 3
CWBS Level 4
CWBS Level 5

Enter WBS Category Names

CLASSIFICATION

What is Critical?

(U) CWBS CPI Worksheet

| | | | | ARTPC Questionaire | | | | | | | | | DoD 5200.39-R | | | |
|---|---|---|---|---|---|---|---|---|---|---|---|---|---|---|---|---|
| **CWBS Element** | **Asset ID** | **Asset/Category Name** | **Concepts** | **Materials** | **Design** | **Manufacturing** | **Integration** | **Operations** | **MCTC70STL7 T CR DoDI-S-5230** | **Leap Ahead Tech** | **KPP** | **NSA Req** | **Question 1** | **Question 2** | **Question 3** | **Question 4** |
| 1 | | **System** | | | | | | | | | | | | | | |
| 11 | Asset 2 | Item 3 Name | x | x | | | x | x | | | | x | | | | |
| 1101 | Asset 1 | lem 1Name | x | | x | | | | | | | | | | | |
| 1111 | Asset 6 | Item 8 Name | | | | x | | | | | | | | | | |
| 1A111 | Asset 7 | Item 9 Name | | x | | x | | | | | | | | | x | |
| 1V11 | Asset 8 | Item 10 Name | | | | | x | | | | | | | | | |
| | | | | | | | | | | | | | | | | |
| | 2 | Category 2 Name | | | | | | | | | | | | | | |
| 21 | Asset 3 | Item 4 Name | | | x | | | | | | | | | | | |
| 21001 | Asset 4 | Item 6 Name | | | | | | x | | | | | | | | |
| 211 | Asset 5 | Item 7 Name | | x | x | | | | | | | | | | | |
| 211A | Asset 9 | Item 11 Name | | | | | x | x | | | | | | | | |
| | | | | | | | | | | | | | | | | |
| 3 | | **Category 3 Name** | | | | | | | | | | | | | | |
| 31 | Asset 10 | Item 12 Name | x | x | | | x | x | | | | | | | | |

FIG. 2C (U) Subsystem XXXXXXXXXXXXX

CLASSIFICATION # of Assets = 10

| (U) Asset ID and Valuation Summary Worksheet | | | | | Value | | | | |
|---|---|---|---|---|---|---|---|---|---|
| Asset ID | Item Number | Asset Name | Overall WC Impact | Maximum Risk Duration (years) | Exploitation Time (years) | Mission ($K) | NRE Cost ($k) | RE Cost ($k) | |
| Asset 1 | Item 1 | Item I Name | 1 | 8 | 1 | 1,500 | 250 | 200 | |
| Asset 2 | Item 3 | Item 3 Name | 4 | 8 | 4 | 850 | 20 | 155 | |
| Asset 3 | Item 4 | Item 4 Name | 3 | 6 | 4 | 625 | 500 | 500 | |
| Asset 4 | Item 6 | Item 6 Name | 9 | 6 | 5 | 2,000 | 1,400 | 1,000 | |
| Asset 5 | Item 7 | Item 7 Name | 0 | 6 | 5 | 775 | 300 | 215 | |
| Asset 6 | Item 8 | Item 8 Name | 3 | 6 | 5 | 550 | 435 | 75 | |
| Asset 7 | Item 9 | Item 9 Name | 0 | 6 | 6 | 335 | 150 | 15 | |
| Asset 8 | Item 10 | Item 10 Name | 0 | 6 | 5 | 790 | 260 | 375 | |
| Asset 9 | Item 11 | Item 11 Name | 0 | 6 | 8 | 900 | 675 | 100 | |
| Asset 10 | Item 12 | Item 12 Name | 0 | 6 | 0 | 150 | 20 | 20 | |

FIG. 2D (U) Subsystem XXXXXXXXXXXXX

CLASSIFICATION (U) Threat Vulnerability Summary Worksheet

| Threat Designator | Threat Name | Threat Rating | Worst Case Susceptibility | Worst Case Vulnerability | Worst Case Threat Environment(s) based on Vulnerability |
|---|---|---|---|---|---|
| T1 | Capture Seizure | 5 | 5 | 5 | Design and Development, Operations at Sea Operations on/over Foreign Soil, Overhaul Maintenance (DoD/US Depot Level), Field or FMS User Maintenance, Storage/Warehousing |
| T2 | Theft of Hardware | 4 | 5 | 4 | Production Operations at Sea, Operations on/over Foreign Soil, Overhaul Maintenance (DoD/US Depot Level), Field or FMS User Maintenance, Storage/Warehousing |
| T3 | Theft of Software | 5 | 5 | 5 | Domestic Operations, Operations at Sea, Operations on/over Foreign Soil, Overhaul Maintenance (DoD/US Depot Level), Field or FMS User Maintenance, Storage/Warehousing |
| T4 | Accidental Loss | 5 | 5 | 5 | Overhaul Maintenance (DoD/US Depot Level), Field or FMS User Maintenance, Storage/Warehousing |
| T5 | Unauthorized Access | 5 | 5 | 5 | Field or FMS User Maintenance Storage/Warehousing |
| T6 | Technology Abandonment | 5 | 4 | 4 | Operations at Sea |
| T7 | Emarations | 1 | 5 | 1 | Storage/Warehousing |
| T8 | Social Engineering | 2 | 5 | 2 | Operations at Sea, Operations on/over Foreign Soil, Overhaul Maintenance (DoD/US Depot Level), Field or FMS User Maintenance, Storage/Warehousing |
| T9 | Docs/InnfoTheft | 5 | 5 | 5 | Overhaul Maintenance (DoD/US Depot Level), Field or FMS User Maintenance, Storage/Warehousing |
| | | | | | Operations at Sea, Operations on/over Foreign Soil, Overhaul Maintenance |

FIG. 2E (U) Attack Analysis Summary Worksheet

CLASSIFICATION # of Attacks =35

| Attack Number | Tamper Attack? | CM Attacked | Threat | Asset Affected | Attack Method | Likelihood of Attack | Attack Impact | WC Vul | Exploit Timeline (years) | Consequences | Countermeasures |
|---|---|---|---|---|---|---|---|---|---|---|---|
| Attack 1 | FALSE | | T1 | Asset 1 | Capture specific devices or places | 5 | 0 | 5 | 2 | None | NR |
| Attack 2 | FALSE | | T1 | Asset 2 | Forced Landing | 4 | 2 | 1 | 7 | Bad | |
| Attack 3 | FALSE | | T1 | Asset 3 | Attack method 3 | 1 | 0 | 1 | 4 | Not bad | NR |
| Attack 4 | FALSE | | T1 | Asset 4 | Attack 4 method | 2 | 0 | 3 | 3 | Trivial | NR |
| Attack 5 | FALSE | | T2 | Asset 5 | Attack 5 method | 4 | 0 | 2 | 5 | None | NR |
| Attack 6 | FALSE | | T2 | Asset 6 | Attack 6 method | 2 | 1 | 2 | 5 | Attack 6 Impact explanation | Cloaking |
| Attack 7 | FALSE | | T2 | Asset 7 | Attack 7 method | 1 | 1 | 1 | 6 | Attack 7 Impact explanation | NR |
| Attack 8 | FALSE | | T2 | Asset 8 | Attack 8 method | 2 | 0 | 2 | 5 | None | NR |
| Attack 9 | FALSE | | T2 | Asset 9 | Attack 9 method | 3 | 0 | 2 | 8 | None | NR |
| Attack 10 | FALSE | | T2 | Asset 10 | Attack 10 method | 4 | 0 | 4 | 0 | None | NR |
| Attack 11 | FALSE | | T3 | Asset 1 | Steal source code | 5 | 2 | 5 | 1 | Attack 11 Impact explanation | Smoke and Mirrors |
| Attack 12 | FALSE | | T3 | Asset 2 | Steal binary software | 1 | 1 | 1 | 2 | Attack 12 impact explanation | |
| Attack 13 | FALSE | | T3 | Asset 3 | Steal firmware | 2 | 0 | 1 | 4 | None | NR |
| Attack 14 | FALSE | | T4 | Asset 4 | Crash landing | 3 | 1 | 3 | 4 | Attack 14 Impact explanation | |
| Attack 15 | FALSE | | T4 | Asset 5 | Attack 15 method | 4 | 0 | 2 | 5 | None | NR |
| Attack 16 | FALSE | | T4 | Asset 6 | Attack 16 method | 5 | 3 | 2 | 7 | Attack 16 Impact explanation | |
| Attack 17 | FALSE | | T4 | Asset 7 | Attack 17 method | 1 | 0 | 1 | 7 | None | NR |
| Attack 18 | FALSE | | T4 | Asset 8 | Attack 18 method | 2 | 0 | 2 | 8 | None | NR |
| Attack 19 | FALSE | | T5 | Asset 9 | Attack 19 method | 3 | 2 | 2 | 8 | Attack 19 Impact explanation | |
| Attack 20 | FALSE | | T5 | Asset 10 | Attack 20 method | 4 | 0 | 4 | 1 | None | NR |
| Attack 21 | FALSE | | T5 | Asset 1 | Attack 21 method | 5 | 0 | 5 | 2 | None | NR |
| Attack 22 | FALSE | | T5 | Asset 2 | Attack 22 method | 1 | 1 | 1 | 3 | Attack 22 Impact explanation | |
| Attack 23 | FALSE | | T6 | Asset 3 | Attack 23 method | 2 | 2 | 1 | 4 | Attack 23 Impact explantion | Blowing Smoke |
| Attack 24 | FALSE | | T6 | Asset 4 | Attack 24 method | 3 | 3 | 3 | 5 | Really bad | Self Destruct |
| Attack 25 | FALSE | | T6 | Asset 5 | Attack 25 method | 4 | 0 | 2 | 6 | None | NR |
| Attack 26 | FALSE | | T6 | Asset 6 | Attack 26 method | 5 | 1 | 2 | 7 | Attack 26 Impact explanation | |
| Attack 27 | FALSE | | T7 | Asset 7 | Attack 27 method | 1 | 1 | 1 | 8 | Attack 27 Impact explanation | NR |
| Attack 28 | FALSE | | T8 | Asset 8 | Attack 28 method | 2 | 0 | 2 | 5 | None | NR |
| Attack 29 | FALSE | | T9 | Asset 9 | Steal technical orders | 3 | 0 | 2 | 8 | None | NR |
| Attack 30 | FALSE | | T9 | Asset 10 | Attack 30 method | 4 | 0 | 4 | 2 | None | NR |
| Attack 31 | FALSE | | T9 | Asset 1 | Capture recorded mission data | 5 | 2 | 5 | 3 | Attack 31 Impact explanation | Mirrors |
| Attack 32 | FALSE | | T10 | Asset 2 | Attack 32 method | 2 | 3 | 1 | 4 | Attack 32 Impact explanation | Real Countermeasures |
| Attack 33 | FALSE | | T10 | Asset 3 | Attack 33 method | 2 | 0 | 1 | 5 | None | |
| Attack 34 | FALSE | | T10 | Asset 4 | Attack 34 method | 3 | 1 | 3 | 6 | Attack 34 Impact explanation | |
| Attack 35 | TRUE | CM24 | T6 | Asset 4 | Attack 35 method | 3 | 1 | 3 | 7 | Attack 35 Explanation of Impact | |

FIG. 2F (U) Subsystem XXXXXXXXXXXXX # of Assets = 10

CLASSIFICATION (U) Risk Summary Worksheet

| Asset ID | Asset Name | Overall WC Impact | Worst Case Vulnerability | Initial AT Risk | Maximum Risk Duration (years) | Worst Case Exploitation Time (years) | Time Factored AT Risk |
|---|---|---|---|---|---|---|---|
| Asset 1 | Item 1 Name | 1 | 5 | | 8 | 1 | 4 |
| Asset 2 | Item 3 Name | 4 | 1 | | 8 | 4 | 3 |
| Asset 3 | Item 4 Name | 3 | 1 | | 6 | 4 | 1 |
| Asset 4 | Item 5 Name | 9 | 3 | | 6 | 5 | 11 |
| Asset 5 | Item 7 Name | 0 | 2 | 0 | 6 | 5 | 0 |
| Asset 6 | Item 5 Name | 3 | 2 | 6 | 6 | 5 | 2 |
| Asset 7 | Item 8 Name | 0 | 1 | 0 | 6 | 5 | 0 |
| Asset 8 | Item 10 Name | 0 | 2 | 0 | 6 | 5 | 0 |
| Asset 9 | Item 11 Name | 0 | 2 | 0 | 6 | 8 | 0 |
| Asset 10 | Item 12 Name | 0 | 4 | | 6 | 0 | 0 |

FIG. 2G (U) Subsystem XXXXXXXXXXXXX

\# of Attack CMs = 5

CLASSIFICATION (U) Countermeasure Requirements Summary Worksheet

| CM Number | Attack | Attack Method | Asset Affected | Countermeasure(s) | Protection Time Required (years) | | |
|---|---|---|---|---|---|---|---|
| CM5 | Attack 6 | Attack 6 method | Asset 6 | Cloaking | 1 | | |
| CM11 | Attack 11 | Steal source code | Asset 1 | Smoke and Mirrors | 7 | | |
| CM23 | Attack 23 | Attack 23 method | Asset 3 | Blowing Smoke | 2 | | |
| CM24 | Attack 24 | Attack 24 method | Asset 4 | Self Destruct | 1 | | |
| CM31 | Attack 31 | Capture recorded mission data | Asset 1 | Mirrors | 5 | | |
| CM32 | Attack 32 | Attack 32 method | Asset 2 | Real Countermeasures | 4 | | |

FIG. 2H (U) Subsystem XXXXXXXXXXXXX

CLASSIFICATION (U) AT Concept Solution Set Summary

\# of Attack CMs = 6

| CM Number | Selected Concept Number | NRE Cost To Implement Concept (SK) | RE Cost to Implement Concept (SK) | Ease of Implementation | Concept Protection Time (years) | AT Layered Technique(s) | |
|---|---|---|---|---|---|---|---|
| CM5 | Concept 1 | 10 | 20 | Medium cost and technical difficulty | 1 | Tech 2 | |
| CM11 | Concept 3 | 30 | 50 | Hard cost and schedule. Must employ new technology | 7 | Tech 1, Tech 5, Tech 6 | |
| CM23 | Concept 6 | 20 | | Describe ease of implementation of Concept 5 | 6 | Tech 3, Tech 6 | |
| CM24 | Concept 7 | 10 | | Describe ease of implementation of Concept 7 | 1 | Tech 5 | |
| CM31 | Concept 8 | 20 | | Describe ease of implementation of Concept 8 | 6 | Tech 1, Tech 6 | |
| CM32 | Concept 10 | 40 | | Describe ease of implementation of Concept 10 | 7 | Tech 2, Tech 4, Tech 6 | |

FIG. 2I

(U) Subsystem XXXXXXXXXXXX

CLASSIFICATION

(U) Implementation Parameters Worksheet # of Attack CMs = 6

| CM Number | Implementation Concept | Concept Implementation Approach | Proviso or AT Requirement | Asset D | CPI Name | Anti-Tamper Techniques | Verification Method |
|---|---|---|---|---|---|---|---|
| CM5 | Concept 1 | 255 bit AES will be used and is approved by NSA | Proviso #3. thou shall protect the software | Asset 6 | Item 8 Name | Tech 2 | I,C |
| CM11 | Concept3 | Concept 3 Description | Proviso #7 | Asset 1 | Item 1 Name | Tech 1, Tech 5, Tech 6 | I |
| CM23 | Concept 6 | Concept 6 Description | Proviso #25 | Asset 3 | Item 4 Name | Tech 3, Tech 6 | I |
| CM24 | Concept 7 | 56 bit AES will be used and is approved by NSA | Proviso #54 | Asset 4 | Item 6 Name | Tech 5 | I,C |
| CM31 | Concept 8 | Concept 8 Description | Proviso #60 | Asset 1 | Item 1 Name | Tech 1, Tech 6 | I |
| CM32 | Concept 10 | Concept 10 description | Proviso #40 | Asset 2 | Item 3 Name | Tech 2, Tech 4, Tech 6 | A |

FIG. 2J

CLASSIFICATION

(U) AT Plan Process Flow Status Worksheet

*Process Steps*

Exploitation Estimate | AT Solutions

| **Sub-System** | Identify HW/SW by WBS | CPI Evaluation Tool | Identify CPI Items | Determine Threats | Attack Trees | Determine Vulnerabilities | Determine Threat Impacts | Determine Initial Threat Risk | Determine Exploitation Timeline | Determine Maximum Risk Duration | Time Factored Risk | Define required AT | Determine Available AT Methods | Tamper Trees | Reevaluate Time Factored Risk (as necessary) | Develop AT Implementation Concepts | Determine AT Solution Set | Document Prel. Cost of AT Implementation | Document AT Implementation Parameters | Final AT Plan p/o PPP |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| | | | | | | | | | | | | | | | | | | | | |
| Intelligence Gizmo | | | | | | | | | | | | | | | | | | | | |
| Defense Widget | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |

| Completion Code Key | |
|---|---|
| | 100% |
| 6 | >75% |
| 5 | >25% |
| 4 | 0% |

FIG. 2K

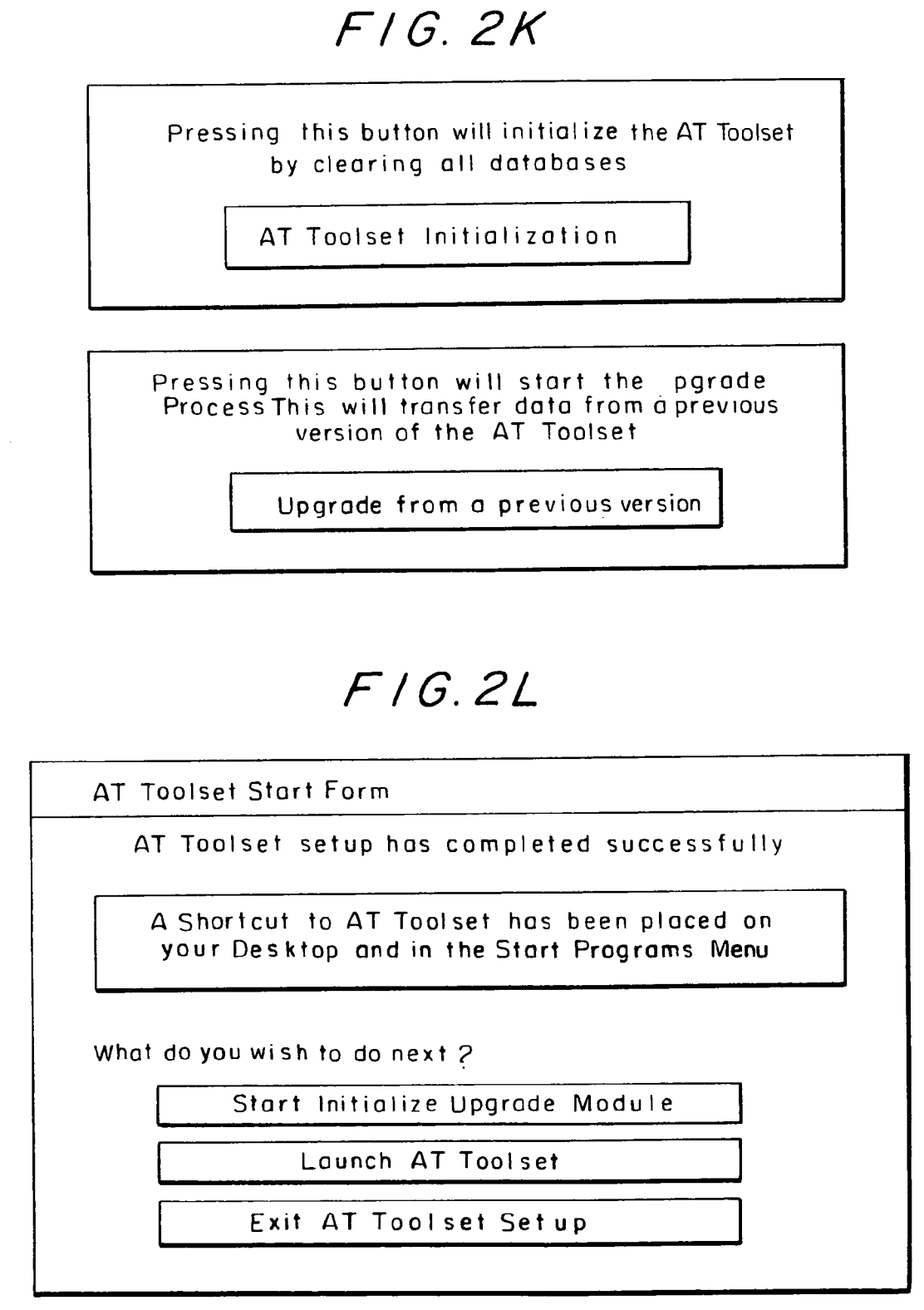

Pressing this button will initialize the AT Toolset by clearing all databases

AT Toolset Initialization

Pressing this button will start the pgrade Process This will transfer data from a previous version of the AT Toolset Upgrade from a previous version

FIG. 2L

AT Toolset Start Form

AT Toolset setup has completed successfully

A Shortcut to AT Toolset has been placed on your Desktop and in the Start Programs Menu What do you wish to do next ?

Start Initialize Upgrade Module

Launch AT Toolset

Exit AT Toolset Setup

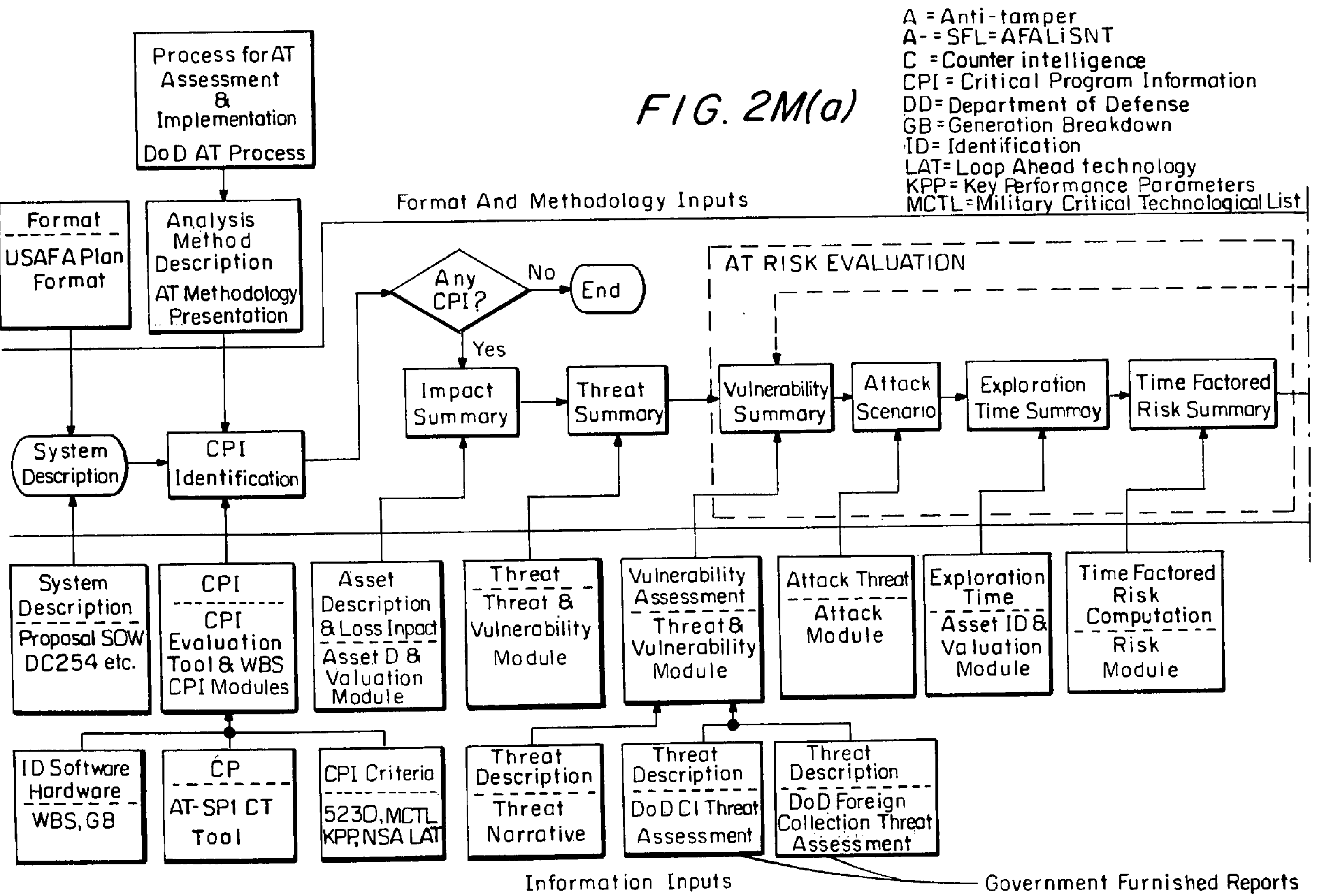
FIG. 2M(a)
A = Anti-tamper
A- = SFL = AFALiSNT
C = Counter intelligence
CPI = Critical Program Information
DD = Department of Defense
GB = Generation Breakdown
ID = Identification
LAT = Loop Ahead technology
KPP = Key Performance Parameters
MCTL = Military Critical Technological List
Process for AT Assessment & Implementation
DoD AT Process
Format
USAF A Plan Format
Analysis Method Description
AT Methodology Presentation
Format And Methodology Inputs
Any CPI?
No
End
Yes
AT RISK EVALUATION
Impact Summary
Threat Summary
Vulnerability Summary
Attack Scenario
Exploration Time Summay
Time Factored Risk Summary
System Description
CPI Identification
System Description
Proposal SOW DC254 etc.
CPI
CPI Evaluation Tool & WBS CPI Modules
Asset Description & Loss Inpact
Asset D & Valuation Module
Threat
Threat & Vulnerability Module
Vulnerability Assessment
Threat & Vulnerability Module
Attack Threat
Attack Module
Exploration Time
Asset ID & Valuation Module
Time Factored Risk Computation
Risk Module
ID Software Hardware
WBS, GB
CP
AT-SP1 CT Tool
CPI Criteria
523D, MCTL KPP, NSA LAT
Threat Description
Threat Narrative
Threat Description
DoD CI Threat Assessment
Threat Description
DoD Foreign Collection Threat Assessment
Information Inputs
Government Furnished Reports

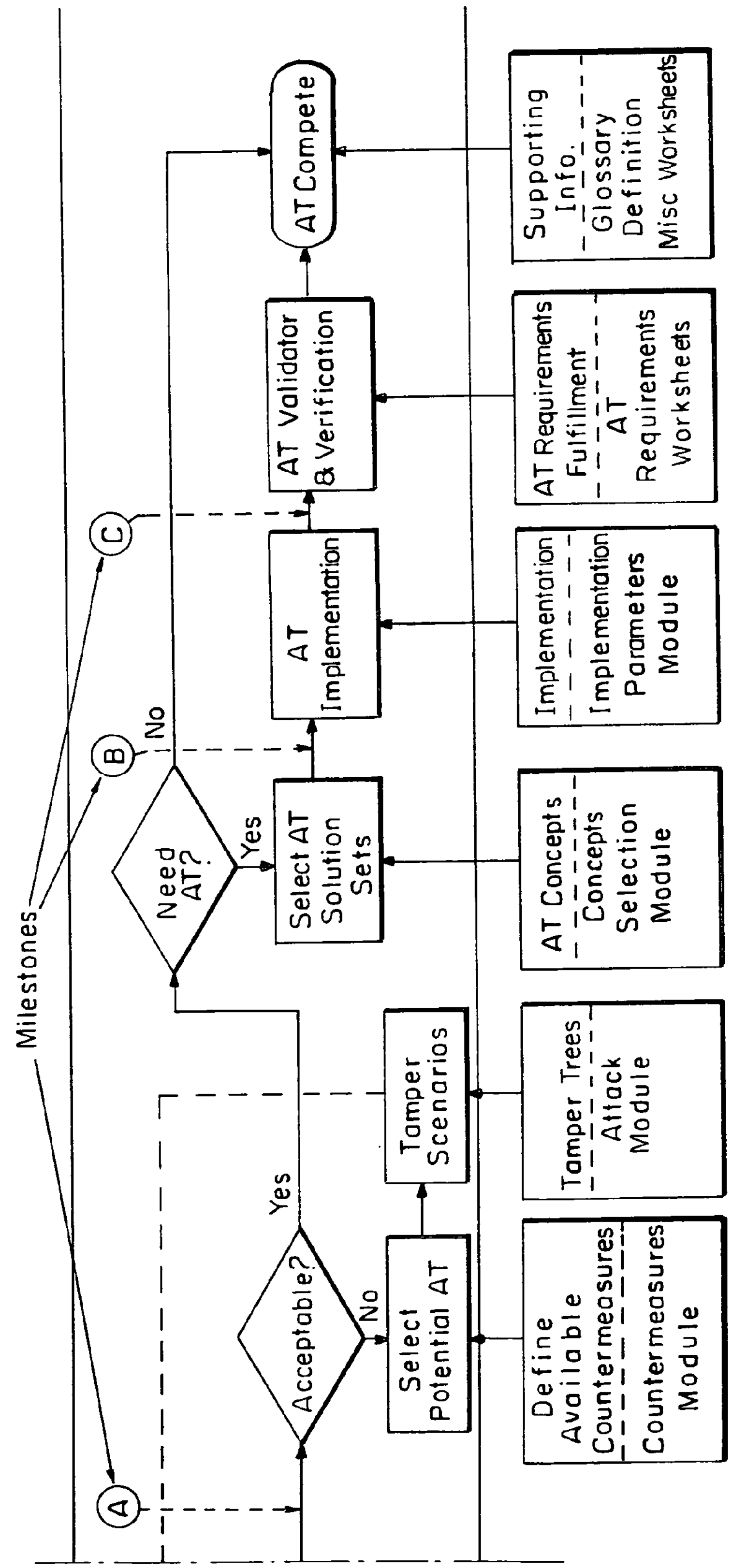
FIG. 2M(b)
Milestones
A
B
C
Acceptable?
No
Yes
Select Potential AT
Tamper Scenarios
Need AT?
Yes
No
Select AT Solution Sets
AT Implementation
AT Validator & Verification
AT Compete
Define Available Countermeasures
Countermeasures Module
Tamper Trees
Attack Module
AT Concepts
Concepts Selection Module
Implementation
Implementation Parameters Module
AT Requirements Fulfillment
AT Requirements Worksheets
Supporting Info.
Glossary Definition Misc Worksheets

FIG. 3

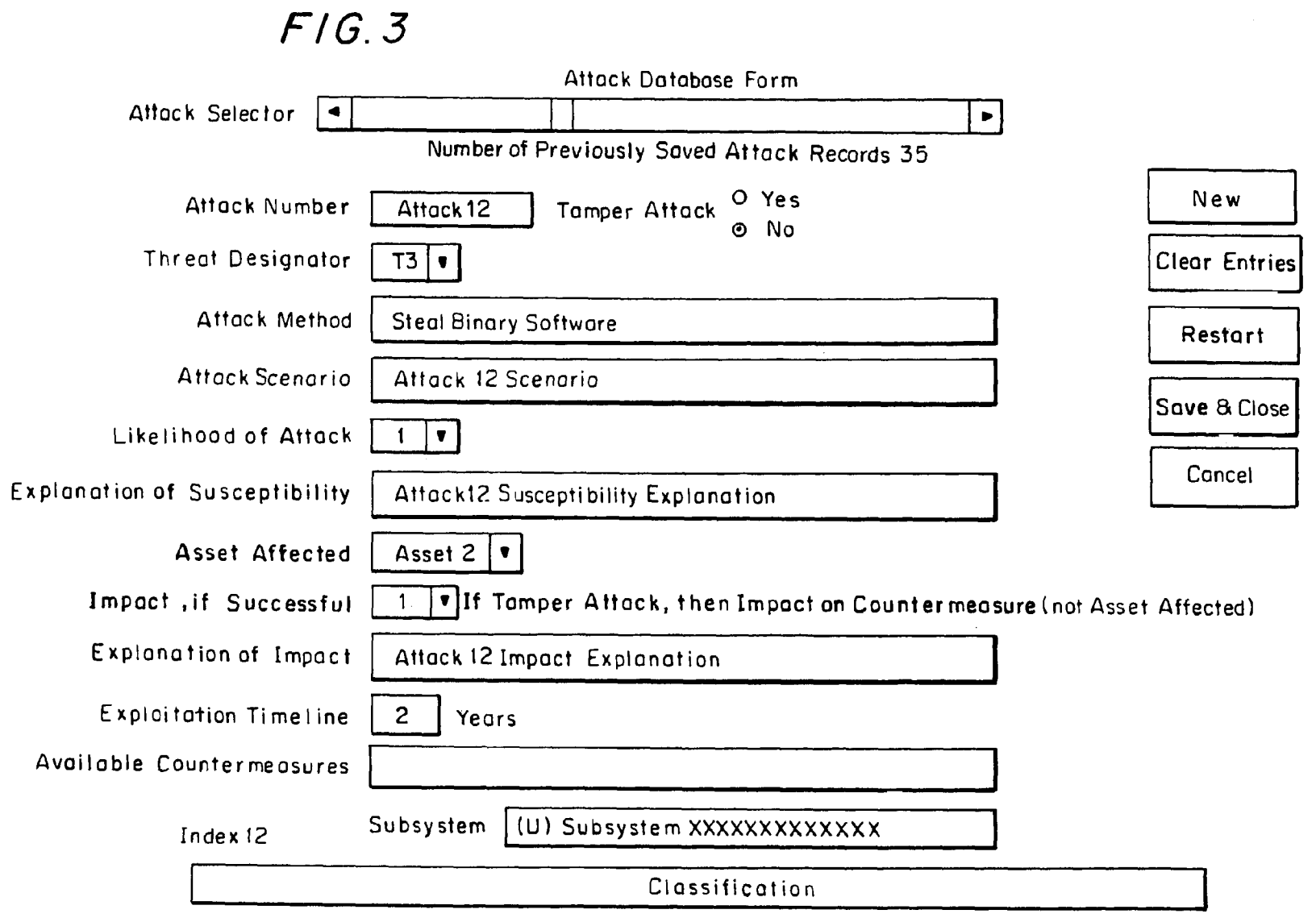

Attack Database Form

Attack Selector

Number of Previously Saved Attack Records 35

Attack Number: Attack12
Tamper Attack: O Yes ⊙ No

Threat Designator: T3

Attack Method: Steal Binary Software

Attack Scenario: Attack 12 Scenario

Likelihood of Attack: 1

Explanation of Susceptibility: Attack12 Susceptibility Explanation

Asset Affected: Asset 2

Impact, if Successful: 1 If Tamper Attack, then Impact on Countermeasure (not Asset Affected)

Explanation of Impact: Attack 12 Impact Explanation

Exploitation Timeline: 2 Years

Available Countermeasures

Index 12

Subsystem: (U) Subsystem XXXXXXXXXXXX

Classification

New

Clear Entries

Restart

Save & Close

Cancel

FIG. 5

(U) Subsystem XXXXXXXXXXXXX

CLASSIFICATION # of Threats = 10

(U)Threat Attack Summary Worksheet

| Threat Designator | Threat Name | Attack(s) | Worst Case Attack(s) | |
|---|---|---|---|---|
| T1 | Capture/Seizure | Attack 1, Attack 2, Attack 3, Attack 4 | Attack 2 | |
| T2 | Theft of Hardware | Attack 5, Attack 6, Attack 7, Attack 8, Attack 9, Attack 10 | Attack 6 | |
| T3 | Theft of Software | Attack 11, Attack 12, Attack 13 | Attack 11 | |
| T4 | Accidental Loss | Attack 14, Attack 15, Attack 16, Attack 17, Attack 18 | Attack 14 | |
| T5 | Unauthorized Access | Attack 19, Attack 20, Attack 21, Attack 22 | Negligible Risk | |
| T6 | Technology Abandonment | Attack 23, Attack 24, Attack 25, Attack 26, Attack 35 | Attack 24 | |
| T7 | Emanations | Attack 27 | Negligible Risk | |
| T8 | Social Engineering | Attack 28 | Negligible Risk | |
| T9 | Docs/Info Theft | Attack 29, Attack 30, Attack 31 | Attack 31 | |
| T10 | Threat 10 Name | Attack 32, Attack 33, Attack 34 | Attack 32 | |

ANTI-TAMPER PROCESS TOOLSET

BACKGROUND

Project development, whether involving building construction, government contracting, software development or the like, requires planning for contingencies which may arise affecting completion or implementation of the project. Some contingencies may involve deliberate attempts to cause failure such as security system tampering. In such an instance, the project should be able to defeat the tamper attempt. Planning for such contingencies of project tampering is usually done on an ad hoc non systematic basis. Until now, no robust anti-tamper planning measures have been available.

BRIEF DESCRIPTION OF THE DRAWINGS

FIGS. 2A-2M illustrate operational modules (e.g. Excel™-based workbooks) operable to carry out the anti-tamper process toolkit.

FIG. 3 illustrates an Attack/Tamper tree diagram.

FIG. 5 illustrates a threat/attack summary worksheet.

DETAILED DESCRIPTION

A system and method are provided for identifying and analyzing attacks against, risks/threats to and countermeasures against projects/project goals/assets including security related functions, government contracting projects, etc.

Figure 1A:
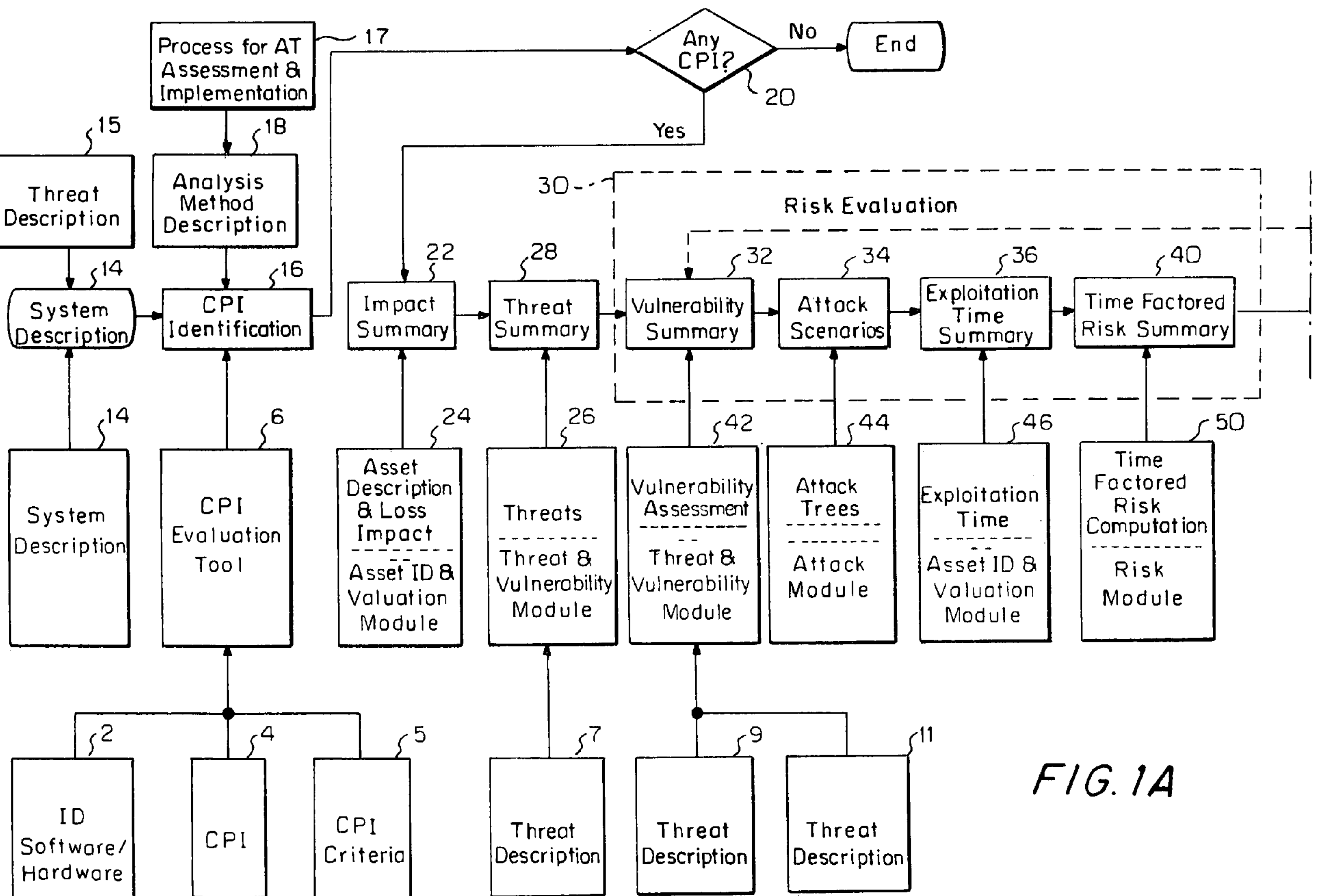
FIG. 1 illustrates a diagram showing the anatomy, i.e., both the functional layout of an anti-tamper process toolset and its process flow, of the anti-tamper process toolset.

FIG. 1 illustrates a diagram showing the anatomy, i.e., both the functional layout of an anti-tamper process toolset and its process flow, of the anti-tamper process toolset for accomplishing the foregoing. For a given project, particularly involving security, a number of measures may be taken to defeat the very purpose of a particular project protocol, device, method, system, etc. The project protocol, device, method or system may relate to a defense system, security system or even a relatively simple alarm system for a home business or automobile. For instance, a monitored alarm system may include a wireless transmitter for notifying a monitoring station in the instance of an alarm event in case a telephone landline is not functioning (e.g., telephone wires have been cut during a burglary). The wireless transmitter serves as a countermeasure taken against the alarm system in an instance where tampering of the monitoring capability of the alarm system has occurred (e.g., telephone monitoring wires cut). For any given alarm system, there are a host of threats/attacks (threats and attacks are used herein interchangeably) that may occur which should be contemplated in advance of the system's design so that proper measures may be designed-in to properly defeat tampering, properly allocate funding for countermeasures against such tampering and properly assess and allocate tampering risks in the design of the alarm system.

The elements shown in FIG. 1 may be carried out using a series of workbooks, i.e. modules. In one aspect, the workbooks may be presented as a suite of highly automated and fully integrated workbooks. Workbooks represent a functionality found in spreadsheet programs such as Microsoft® EXCEL® or IBM® Lotus® 1-2-3®. Such workbooks may be implemented according to, for instance, a couple of thousand lines of Visual Basic™ automation code using modules. Program initialization and upgrades may likewise occur in connection with using modules. Further, a hidden database module having anti-tamper protections may be used to provide near-immediate data updates for other modules.

Operational modules (e.g. Excel™-based workbooks) operable to carry out the anti-tamper process toolkit are described below and illustrated in FIGS. 2A-2M.

CPI Tool Workbook

This workbook is illustrated in FIG. 2A and guides the user through the CPI (Critical Program Information) evaluation process to determine which items within the subsystem can meet CPI criteria. If an Item is determined to be Critical, it is automatically assigned an Asset ID number for tracking throughout the other modules of the AT Toolset.

WBS CPI Workbook

This workbook is illustrated in FIG. 2B and provides a means for cross-referencing CPI criteria versus contractor Work Breakdown Structure elements.

Asset ID and Valuation Workbook

This workbook is illustrated in FIG. 2C and allows for an automatic roll-up of the CPI (Assets), for input of additional description and value information about each Asset, and assignment of an Impact rating if the Asset were totally lost. In general, for all workbooks, the roll-up feature of a spreadsheet program may be employed in order to run several changing scenarios in short order.

Threat and Vulnerability Workbook

This workbook is illustrated in FIG. 2D and allows for an automatic roll-up of data gathered in previous workbooks, for definition of possible threats to the subsystem, and for input of susceptibility ratings of the threats against each Asset in each of the various environments that the subsystem will be subjected to throughout its life. The data is ultimately transformed into the susceptibilities of each Asset to the various threats in each environment. This form of the data allows for the worst case exploitation analysis against each Asset.

Attack Workbook

This workbook is illustrated in FIG. 2E and allows for an automatic roll-up of data gathered in the previous workbooks, for definition of possible Attack scenarios against each Asset, for input of the likelihood of each Attack and assignment of impact rating of a successful Attack. It may utilize a unique algorithm to automatically generate an Attack Tree diagram for the Subsystem based upon the data input in this and previous workbooks.

Risk Workbook

This workbook is illustrated in FIG. 2F and utilizes the data gathered in the previous workbooks to perform an exploitation risk computation. A worst-case initial and a time-factored Risk rating is computed for each Asset. The CPI Tool, Asset ID and Valuation, Threat and Vulnerability, and Attack workbooks must be filled in prior to using this workbook.

Countermeasures Workbook

This workbook is illustrated in FIG. 2G and takes the outputs from the previous workbooks and displays a Worst Case/Negligible Risk status of each Attack against each Asset. Countermeasure methods are defined, as required, and the user goes back to previous workbooks to adjust parameters based upon the Countermeasure application, and a new worst-case Risk Analysis is performed based upon the results. Initial and final Time-Factored Risk levels are recorded. The Initial Time-Factored Risk for each Attack scenario is recorded before any countermeasures are utilized. Final Time-Factored Risk for each Attack scenario is recorded after countermeasures, if required, are applied and analyzed. If countermeasures are not required, then the Final Time-Factored Risk for the Attack scenario is recorded at the same time that the Initial Time-Factored Risk is recorded. When Final Time-Factored Risk is recorded, that Attack scenario is automatically turned off and the next Worst-Case Attack on the Asset is assessed. The Attack, Asset ID and Valuation, Threat and Vulnerability, and Attack workbooks must be filled in prior to using this workbook.

Concepts Selection Workbook

This workbook is illustrated in FIG. 2H and takes the outputs from the Countermeasures workbook and leads the user through the AT Concept selection process. Available AT techniques are entered, Concepts developed based upon layered AT Techniques, as necessary, and an AT Concept solution set is selected for each Countermeasure requirement established in the Countermeasures workbook.

Implementation Parameters Workbook

This workbook is illustrated in FIG. 2I and provides for an automatic roll-up of countermeasure requirements analysis from previous workbooks, and for the input of specific contract requirements for each Countermeasure and definition of the V&V (Verification and Validation) methods that will be used to confirm successful treatment of Risk.

Health Status Workbook

This workbook is illustrated in FIG. 2J and documents Sub-system and overall system AT progress status.

Toolset Initialization Workbook

This workbook is illustrated in FIG. 2K and provides a mechanism for the user to either empty the AT Toolset database to start a new subsystem analysis or to transfer data from an earlier version of AT Toolset into this version.

Toolset Setup Workbook

This workbook is illustrated in FIG. 2L and extracts the Toolset files. It also places a shortcut to this instance of AT Toolset on the Desktop and in the Windows-Start-Programs menu.

Implementation Flow Workbook

This workbook is illustrated in FIG. 2M and displays the flow diagram describing the functionality and sequence of the various AT Toolset components.

With reference to FIG. 1, a first step in identifying a tamper scenario for a project, apparatus, method, etc. involves designation of the project, apparatus, method etc. as shown in block 2 which may be identified, for instance as software or hardware. Block 2 may simply document the purpose of the project (including methods or apparatti) to be implemented along with a general breakdown of the thing to be accomplished and/or its work breakdown structure. Block 2 may be, for instance, a document in a spreadsheet.

Block 4 illustrates critical program information as determined by some other source which, along with critical program criteria from block 5 and information from block 2, rolls up into workbook 6 containing a critical program information tool for determining further critical program information (CPI, information necessary for carrying out the goals of a project).

Block 7 represents a description of overall threats to project, apparatus or method while blocks 9 and 11 represent descriptions of threats to a project, apparatus or method as furnished for instance by a source, such as a government report. This threat information rolls up into threat vulnerability modules which summarize particular threats and determine vulnerability to a specific threat respectively.

For the process flow shown in FIG. 1, CPI identification 16 is determined from system description 14 using an analysis method described in block 18. The analysis method is determined by a given process for anti-tamper assessment and implementation 17. Decision tree 20 results in identified CPIs undergoing an impact study based on an asset description and loss impact as determined by asset identification and valuation module 24. System description 14 also takes into account threat description 15.

Threats described in representative blocks 7, 9 and 11 are analyzed in threat and vulnerability module 26. Threats are summarized in block 28 in terms of critical information.

Risk evaluation is determined within module 30 using a vulnerability summary 32, attack scenarios 34, exploitation time summary 36, resulting in time factored risk summary 40. Threats from modules 9 and 11 roll up into threat and vulnerability module 42 which provides a vulnerability assessment of the overall project (that is system, method or apparatus) to a threat. Each summary within module 30 is determined by a corresponding module. For instance, attack scenarios 34 are determined by attack module 44; exploitation time summary 36 is determined by asset identification and valuation module 46; and time factored risk summary 40 is determined by risk module 50. Attack module 44 generates attack trees, branched scenarios identified as posing a particular risk to a project. Asset identification and valuation module 46 evaluates the seriousness of a particular threat as it may occur within a given period of time. Risk module 50 makes a time factored risk calculation. Decision tree 52 determines whether the risk involving a particular threat to a project is within an acceptable predetermined risk range. Should the risk be determined to be unacceptable, module 54 user selects potential anti-tamper countermeasures from countermeasures module 56 wherein available countermeasures are defined. Potential anti-tamper countermeasures are evaluated within tamper scenarios module 58 which defines tamper scenarios against a project in conjunction with using tamper trees generated by attack module 60. Tamper tree may define potential risks to one or more aspects of a project as it progresses over time, through various phases, etc. Tamper scenarios from module 58 are fed back to risk evaluation module 30 for risk evaluation of a potential threat with one or more countermeasures in place from countermeasures module 56 for a potential tamper scenario defined by module 58. The tamper scenario with the one or more anti-tamper countermeasures in place is fed back to decision tree 52. Feedback through risk evaluation module 30 is repeated until decision tree 52 deems a particular risk (with or without a particular anti-tamper countermeasure in place) is acceptable.

Once the risk is deemed acceptable, decision tree 62 determines whether the acceptable risk occurs as a consequence of an anti-tamper countermeasure. Should no anti-tamper countermeasure play a part in making the risk acceptable, the anti-tamper processing is adjudged complete at module 64.

In the instance that the risk is made acceptable as a consequence of one or more anti-tamper countermeasures, solution set module 66 provides anti-tamper concepts from anti-tamper concepts selection module 68. A particular implementation of the anti-tamper concept against a particular threat is provided by anti-tamper implementation module 70 in conjunction with receiving implementation parameters from parameter module 72. Module 74 provides validation and verification of the anti-tamper countermeasure or countermeasures against one or more threats as defined by tamper scenarios module 58. Module 76 contributes anti-tamper requirement through, for instance, a worksheet to module 74 in conjunction with validation and verification of an anti-tamper countermeasure occurring at module 74.

The provision of one or more anti-tamper countermeasures against a particular threat is adjudged complete by module 64 in connection with documenting the anti-tamper countermeasure against the tamper scenario and level of risk as provided by module 80 which supplies related supporting information (e.g., glossary definitions used during the processes) and miscellaneous worksheets used in developing/determining the anti-tamper countermeasure.

The workbooks described herein may also be implemented using forms to allow a visual presentation of information to be entered and calculated. In one aspect, a form, such as that illustrated in FIG. 3, may be used to enter information. A worksheet representation of the form may be printed in a PDF™ format.

Figure 4:
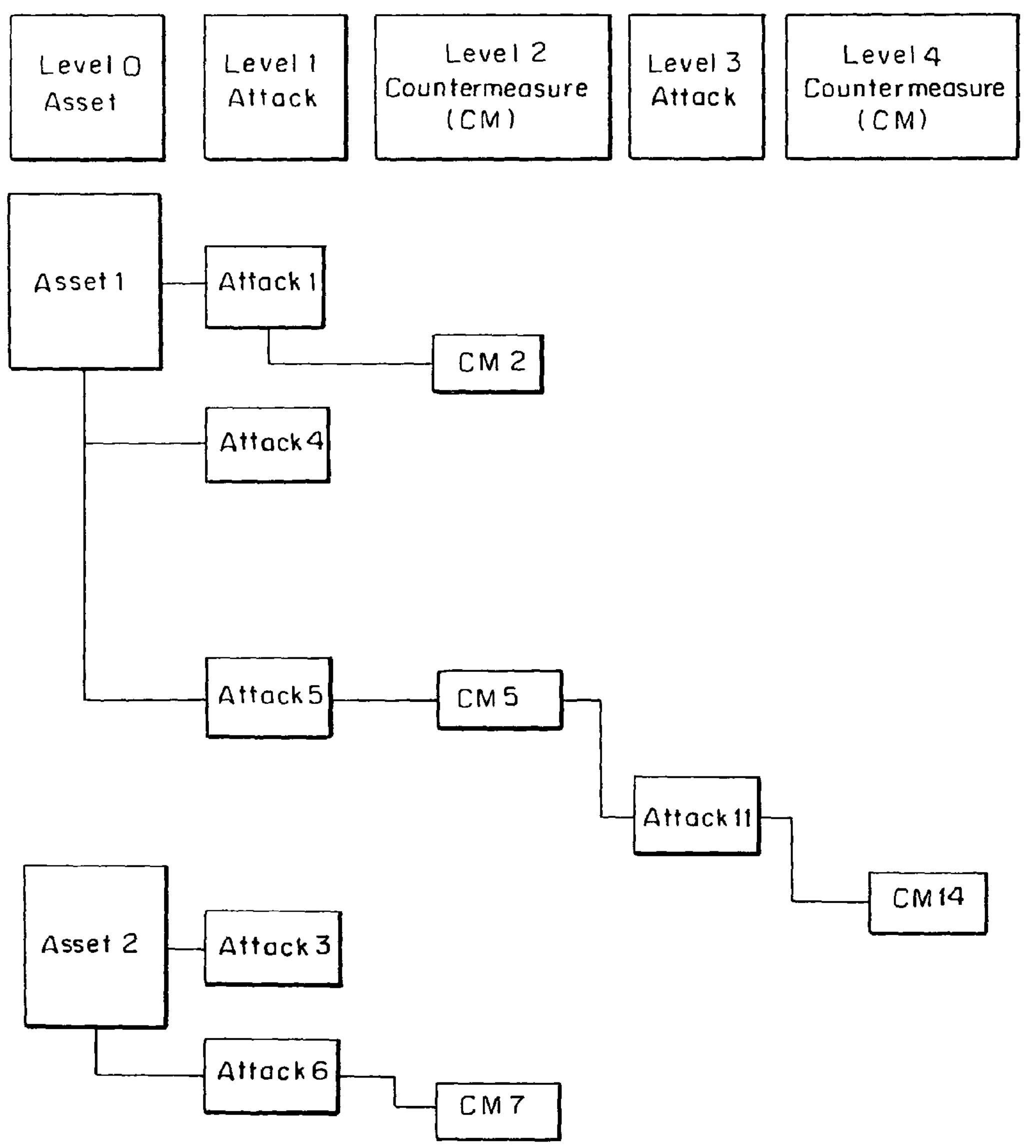
FIG. 4 illustrates a typical database form in the anti-tamper process toolset.

FIG. 4 illustrates an Attack/Tamper tree diagram. Level 0 shows the Asset by number followed direct attacks by number. As shown in FIG. 4, attacks are ordered by number for each asset. At the level 1 attack category, attack 1, attack 4, and attack 5 exists for Asset 1. Level 2 in the Attack/Tamper tree diagram lists the countermeasures (CM) by number available to defeat a particular attack/threat. Consequently, CM 2 can defeat attack 1 while CM 5 can defeat attack 5. Attack level following each countermeasure to be employed are outlined in the Attack/Tamper tree diagram, only a portion of which is shown for purposes of illustration in FIG. 4.

In one aspect, tamper tree diagram generation may occur automatically pursuant to the following:

1) Utilization of data records collected in an effort to determine how a particular threat or particular threats may exploit a weakness in a project. In conjunction with this type of exploitation analysis, hierarchical indices may be assigned to individual data elements in each record in order to access the seriousness of a threat.

2) Hierarchical indices for each data element in a record may be combined into a single, unique, sortable composite record index in assessing a threat.

3) In connection with sorting composite record indices corresponding to, for instance, an attack level, individual hierarchical indices are extracted.

4) The hierarchical attack tree structure may be determined from the extracted hierarchical indices.

5) Hierarchical indices may be replaced with actual associated data elements and the tamper tree diagram may be displayed as shown in FIG. 4.

The foregoing may be used to conduct an anti-tamper exploitation analysis pursuant to determining and/or avoiding risks/threats to a project in terms of regarding each risk as a possible project threat or attack. This analysis may proceed according to the following steps:

1) Gather pertinent threat, impact vulnerability and attack data records.

2) Apply a risk algorithm to data records to assess time-factored risk.

3) Based on time factored risk levels, establish possible countermeasure approaches.

4) Reassess time factored risk resulting from countermeasure approaches.

5) Select the most appropriate countermeasures.

6) Select the most appropriate technical implementation concepts for each countermeasure.

FIG. 5 illustrates a threat/Attack Summary Worksheet for implementing the anti-tamper process toolkit. As shown, threats are designated along with threat names, attack listings, and designation of worst cast scenario.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A programmable computer useable medium having computer readable code embodied in said medium configured to cause a computer to:

process data records comprising information concerning risk, threat vulnerability, impact and security attack;

apply an algorithm to said data records to rate time-factored risks and select appropriate countermeasures and technical implementations therefor against said time-factored risks; and generate forms in connection with providing a graphical user interface provided by a computer spreadsheet application, wherein said computer spreadsheet application generates a plurality of workbooks comprising:

a critical program information (CPI) tool workbook configured to identify data records that are determined to be critical assets according to a predefined criteria; and a work breakdown structure (WBS) critical program information (CPI) workbook configured to provide a plurality of tasks for completion within a project which cross references said tasks with the data records that are determined to be critical assets according to said predefined criteria.

2. A programmable computer useable medium as recited in claim 1 selected from the group consisting of software programming languages.

3. A programmable computer useable medium as recited in claim 1 wherein said plurality of workbooks define interrelationships among data to be entered in said workbooks by said user.

4. A programmable computer useable medium as recited in claim 1 wherein the data records that are determined to be critical assets are automatically assigned an asset identification number by said medium.

5. A programmable computer medium as recited in claim 4 wherein the wherein the plurality of workbooks further comprises an asset identification and valuation workbook is configured to provide automatic roll-up of the critical assets to allow input of descriptive information about each said asset, asset value information and an impact rating for each said asset corresponding to a rating of value should the asset become lost.

6. A programmable computer medium as recited in claim 5 wherein the plurality of workbooks further comprises a threat and vulnerability workbook configured to provide an assessment of susceptibilities of each asset to a threat of a subsystem and to provide an input of a susceptibility rating for each threat to said asset.

7. A programmable computer medium as recited in claim 6 wherein the plurality of workbooks further comprises an attack workbook configured to define one or more attack scenarios against each said asset, said attack workbook is configured to:

store input of data providing a likelihood of success of an attack against an asset; and provide a rating of success of the attack against said asset, an attack tree being capable of being generated from said attack workbook information.

8. A programmable computer medium as recited in claim 7 wherein the plurality of workbooks further comprises a risk workbook configured to perform an exploitation risk computation wherein a worst case initial rating and a time-factored risk rating is computed for each asset using data from workbooks comprising the CPI Tool workbook, the asset ID and Valuation workbook, the threat and vulnerability workbook, and the attack workbook.

9. A programmable computer medium as recited in claim 8 wherein the plurality of workbooks further comprises a countermeasure workbook configured to determine a worst case risk and a negligible risk for each method of attack against a corresponding asset.

10. A programmable computer medium as recited in claim 9 wherein the plurality of workbooks further comprises a concepts selection workbook attack methods from said countermeasure workbook are provided along with a solution set for each countermeasure.

11. A programmable computer medium as recited in claim 10 wherein an implementation parameters workbook comprises contract requirements for each countermeasure included in said countermeasures workbook and methods used to confirm successful treatment of risks to corresponding assets.

12. A programmable computer medium as recited in claim 11 wherein the plurality of workbooks further comprises a health status workbook comprising status information of subsystems and overall system progress for evaluating said possible countermeasures against elements of a project.

13. A programmable computer medium as recited in claim 12 wherein the plurality of workbooks further comprises a tool initialization workbook configured to empty a AT toolset database or transfer data from an earlier version of the AT Toolset into a new version.

14. A programmable computer medium as recited in claim 13 wherein the plurality of workbooks further comprises a tool setup workbook configured to place a shortcut on a desktop and in a Windows Start program menu.

15. A programmable computer medium as recited in claim 14 wherein the plurality of workbooks further comprises an implementation flow workbook configured to display a flow diagram describing the functionality and sequence of various AT Toolset components.

* * * * *